3,506,608
STABILIZING POLYMERS
Harry Braus, Springdale, and Fred D. Waas, Columbus, Ohio, assignors to National Distillers and Chemical Corporation, New York, N.Y., a corporation of Virginia
No Drawing. Continuation of application Ser. No. 523,253, Jan. 27, 1966. This application May 2, 1968, Ser. No. 726,255
Int. Cl. C08f 45/58
U.S. Cl. 260—45.7     1 Claim

ABSTRACT OF THE DISCLOSURE

Polymers of aliphatic olefins having two to eight carbon atoms per molecule are stabilized against degradation with $\alpha,\alpha'$-bis(alkylthio)xylene compounds.

---

This application is a continuation of co-pending application Ser. No. 523,253 filed Jan. 27, 1966 and now abandoned, which application was a continuation-in-part of application Ser. No. 222,929 filed Sept. 11, 1962 also now abandoned.

Polymers of aliphatic olefins, such as for example polypropylene, have numerous valuable properties which permit them to be used in the maufacture of pipe, film, wire, coatings, or various molded objects such as bottles and the like. These polymers have high tensile strength, are not subject to stress cracking, and display very little creep under load. It has been observed, however, that such polymers under conditions of elevated temperature and/or mechanical working, particularly in the presence of oxygen, undergo molecular degradation resulting in a deterioration of physical properties. Adequate stabilization of such polymers is of utmost importance in order to protect the polymer during fabrication and use. The molecular breakdown which occurs in these polymers during fabrication is usually evidenced by a substantial increase in the melt flow rate and in the color of the polymer.

It is an object of this invention to provide a method of stabilizing polymers of aliphatic olefins against both thermal and mechanical degradation. Another object is to provide a stabilized polymer of an aliphatic olefin which can be processed under conditions of elevated temperature and mechanical working without substantial increase in the melt flow rate and without important color change. Still another object is to provide compositions comprising as a major component polymers of aliphatic olefins and as a miner component $\alpha,\alpha'$-bis(alkylthio)xylenes alone or together with other known stabilizers for polymers of aliphatic olefins. Other objects will appear hereinafter.

It has been discovered that polymers of aliphatic olefins, especially those having 2 to 8 carbon atoms per molecule, can be stabilized against degradation by incorporating into the polymer $\alpha,\alpha'$-bis(alkylthio)xylene compounds having the following structure:

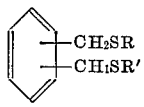

wherein R and R' are alkyl radicals having from about 10 to 22 carbon atoms.

The polymers to which this invention applies are the normally solid polymers of aliphatic olefins having from 2 to 8 carbon atoms per molecule such as polymers of ethylene, propylene, 1-butene, isobutylene, 2-butene, 1-pentene, and 1-hexene, and mixtures and copolymers thereof.

These compounds may be mixed with the polyolefin polymer in any suitable manner that will effect through distribution and dispersion. This can be accomplished in a machine suitable for mixing solids, as by milling the polyolefin with the additive on heated rolls such as are used in the compounding of rubber or on other suitable milling or mixing equipment, such as for example a Banbury mixer or conventional rubber mill. Instead of adding the stabilizing agent to the polymer in the solid or molten state, it can be added to a solution or suspension of polymer in an organic solvent or to an aqueous dispersion thereof and the volatile solvent subsequently removed by vaporization.

In general the amount of agent to be added to the polyolefin polymer depends upon the degree and kind of stabilization desired. The amount of agent added can vary from 0.001 percent to 5.0 percent based on the weight of the polyolefin, but as a rule it is preferred to use the minimum amount required to achieve the desired results. The preferred amount of additive used will ordinarily vary from 0.05 to 0.5 part by weight per hundred parts of polyolefin.

The above defined compounds may be used in combinations with other stabilizers and in particular those of the hindered bisphenol type such as 2,2'-methylene-bis (4-methyl-6-tertiarybutyl-phenol). The novel stabilizers of this invention may also be used in combination with other stabilizers of the hindered bisphenol type such as 2,2' - methylene-bis(4-ethyl-6-tertiarybutyl - phenol); 4,4'-bis(2,6-ditertiarybutyl-phenol); or 2,6 - ditertiarybutyl - $\alpha$-methoxy-p-cresol.

There are certain practical commercial advantages that often accompany the use of such a combination of stabilizers as distinguished from the use of a single stabilizer material or compound. For example, one of the stabilizers of the combination might be costly or difficult to acquire in commercial amounts while the other stabilizer of the combination might be relatively cheap and readily available. In such a situation it is desirable to be able to substitute the cheaper stabilizer for a portion of the more expensive stabilizer and still be able to obtain good stabilization.

In a preferred embodiment of the invention R and R' in the above formula are alkyl radicals having from about 10 to 22 carbon atoms. These compounds may be prepared, for example, by the reaction of an ortho, meta, or paradihalide such as the dichloride or the dibromide with a sodium alkyl mercaptide to form the corresponding $\alpha,\alpha'$-bis(alkylthio)xylene which has the following formula:

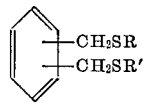

wherein R and R' are alkyl radicals having from about 10 to 22 carbon atoms. Accordingly R and R' may stand for capryl, lauryl, myristyle, palmityl, arachidyl, and the like.

The following examples are presented to be illustrative only and are not intended in any way to limit the claims thereto.

EXAMPLE I

Into a dry three-necked 1000-ml. flask equipped with a water condenser, CaCl$_2$ tube, and stirrer was added 200 ml. of anhydrous ethanol and 11.5 g. of sodium. When solution was complete, 101.2 g. of 1-dodecanethiol was added slowly. The reaction mixture was then maintained at below the boiling point and 43.6 g. of α,α'-dichloro-p-xylene in 300 ml. dry benzene added over a period of an hour. The solution was refluxed for an additional half hour. The reaction was then washed with hot water to remove alcohol and sodium chloride. The benzene was dried and evaporated, leaving behind a white solid compound which is the α,α'-bis(laurylthio)-p-xylene. M.P. 57–59° C. Yield, 104.3 g. S: Calc., 12.64%; Found, 12.25%.

In accordance with the above procedure, but using 1-decanethiol, 1-hexadecanethiol, or 1-octadecanethiol in place of 1-dodecanethiol, the corresponding capryl, palmityl, or stearyl derivative is obtained. Also, by starting with the corresponding ortho or meta xylenes, the ortho or meta derivatives can be made. Also mixtures of the xylene isomers can be used to make the corresponding mixtures of derivatives.

EXAMPLE II

The thermal and oxidative breakdown were determined by measuring the change in flow rate (ASTM D–1238–57T, 2160 g. load; 190° C. for polyethylene and 230° C. for polypropylene) and by observing the color change upon extended milling at 350° F. The samples for testing are prepared in the following manner:

A sample of the polyolefin free of stabilizers and in the form of a 10 mesh powder and the desired quantity of stabilizer as a 1% solution in benzene or acetone are charged to a Hobart mixer. The mixer is allowed to stir until all of the solvent has evaporated. A 400-gram aliquot of the resultant composition is then milled on a two-roll, differential speed, rubber mill at 350° F. Starting from the time at which all of the polymer has melted and banded, 30-gram samples of polymer are removed at 5, 10, 20, 30, 45 and 60-minute intervals.

Portions of each such sample are used for a determination of melt flow rate and for the preparation of a pressed 1-inch by 1-inch by 50-mil sheet for mounting on white cardboard for color comparison.

Test results for α,α'-bis(laurylthio)-p-xylene in polypropylene as a stabilizer are given in Table I.

TABLE I

| Stabilizer | Concentration, wt. percent of polymer[1] | Milling time, minutes at 330–340° F. | Melt flow rate Initial | Melt flow rate Final | Final color |
|---|---|---|---|---|---|
| None | 0 | 0 | 0.5 | | White, no haze. |
|  | 0 | 10 | | 4.66 |  |
|  | 0 | 20 | | 15.6 | Gray. |
| α,α'-bis-(laurylthio)-p-xylene | 0.5 | 60 | 0.5 | 3.36 | White, no haze. |

[1] Unstabilized polypropylene.

In Table I the reference standard for determining improvement is the polymer blank without stabilizer. The sample stabilizer with the α,α'-bis(laurylthio)-p-xylene exhibits significant improvement in both mill stability and color over the blank when degraded for 60 minutes under the test conditions.

EXAMPLE III

The α,α'-bis(laurylthio)-p-xylene was tested in a linear polyethylene (density=0.945, melt index=0.59) for mill stability at 150° C. and for the change in the ratio of carbonyl oxygen to vinyl unsaturation during milling. The latter test is performed by removing a sample during milling, pressing it into a 4-in. x 4-in. x .005-in. sheet, and determining by infrared analysis the ratio of the optical density of the carbonyl groups to that of the methylene groups. This test is a sensitive measure of oxidative degeneration since such degradation is known to proceed by a gradual buildup of carbonyl oxygen.

Results of the tests are presented in Table II below.

TABLE II

| Stabilizer | Concentration, wt. percent of polymer | Milling time, minute at 150° C. | Melt flow rate Initial | Melt flow rate Final | Optical density, CO/CH$_2$ Initial | Optical density, CO/CH$_2$ Final |
|---|---|---|---|---|---|---|
| None |  | 180 | 0.59 | 0.19 | 0.055 | 1.50 |
| α,α'-bis-(laurylthio)-p-xylene | 0.1 | 180 | 0.61 | 0.63 | 0.041 | 0.081 |

EXAMPLE IV

The α,α'-bis(laurylthio)-p-xylene was tested in polyethylene for a variety of other properties, the results of the tests being presented in Tables III through XI below. In each case Run 1 represents polyethylene containing no stabilizer, Run 2 represents polyethylene containing 1000 p.p.m. of stabilizer, and Run 3 represents polyethylene containing 2000 p.p.m. of stabilizer.

TABLE III

[Melt Index of Samples Oven-Aged at 100° C.]

| | Melt index (g./10 min.) for each aging time | | | |
|---|---|---|---|---|
| | No aging | 72 hours | 146 hours | 292 hours |
| Run No.: | | | | |
| 1 | 0.23 | 0.08 | 0.12 | 17.7 |
| 2 | 0.18 | 0.18 | 0.16 | 0.16 |
| 3 | 0.21 | 0.20 | 0.23 | 0.19 |

TABLE IV

[Melt Index of Samples (g./min.) of Samples Roll-Milled at 320° F. for Six Hours]

| | Minutes on 320° F. Mill before Melt Index Test | | | | | | | | | | | |
|---|---|---|---|---|---|---|---|---|---|---|---|---|
| | 0 | 5 | 10 | 20 | 30 | 60 | 90 | 120 | 180 | 240 | 300 | 360 |
| Run No.: | | | | | | | | | | | | |
| 1 | 0.23 | 0.15 | 0.13 | 0.12 | 0.09 | 0.060 | No flow | No flow | No flow | No flow | No flow | 0.039 |
| 2 | 0.18 | 0.17 | 0.18 | 0.19 | 0.18 | 0.20 | 0.21 | 0.010 | 0.002 | 0.002 | 0.032 | 0.036 |
| 3 | 0.21 | 0.22 | 0.22 | 0.21 | 0.22 | 0.23 | 0.24 | 0.25 | 0.29 | 0.33 | 0.30 | 0.22 |

TABLE V

[Tensile Strength (p.s.i.) at Break for 100° C. Oven-Aged Samples]

| | Time in Oven, hours | | | |
|---|---|---|---|---|
| | No aging | 72 | 146 | 292 |
| Run No.: | | | | |
| 1 | 1,890 | 1,490 | 1,230 | 1,350 |
| 2 | 1,900 | 1,770 | 1,920 | 1,800 |
| 3 | 1,940 | 1,920 | 1,870 | 1,860 |

TABLE VI
[Tensile Yield Strength (p.s.i.) for 100° C. Oven-Aged Samples]

| | Time in Oven, hours | | | |
|---|---|---|---|---|
| | No aging | 72 | 146 | 292 |
| Run No.: | | | | |
| 1 | 1,400 | 1,490 | 1,450 | 1,640 |
| 2 | 1,400 | 1,450 | 1,480 | 1,490 |
| 3 | 1,350 | 1,460 | 1,490 | 1,540 |

TABLE VII
[Tensile Elongation at Break (percent) for 100° C. Oven-Aged Samples]

| | Time in Oven, hours | | | |
|---|---|---|---|---|
| | No aging | 72 | 146 | 292 |
| Run No.: | | | | |
| 1 | 550 | 475 | 270 | 135 |
| 2 | 570 | 510 | 610 | 600 |
| 3 | 570 | 600 | 620 | 610 |

TABLE VIII
[Density (g./cc.) of 100° C. Oven-Aged Samples]

| | Time in Oven, hours | | | |
|---|---|---|---|---|
| | No aging | 72 | 146 | 292 |
| Run No.: | | | | |
| 1 | 0.9190 | 0.9199 | 0.9241 | 0.9385 |
| 3 | 0.9184 | 0.9199 | 0.9200 | 0.9232 |

TABLE IX
[Brittleness (Number of Failures at −76° C.) of 100° C. Oven-Aged Samples]

| | Time in Oven, hours | | | |
|---|---|---|---|---|
| | No aging | 72 | 146 | 292 |
| Run No.: | | | | |
| 1 | 1/10 | | | 10/10 |
| 2 | 0/10 | 0/10 | 3/10 | 1/10 |
| 3 | 0/10 | 0/10 | 2/10 | 1/10 |

TABLE X
[Dielectric Constant (100 kc.) of 100° C. Oven-Aged Samples]

| | Time in Oven, hours | | |
|---|---|---|---|
| | No aging | 146 | 292 |
| Run No.: | | | |
| 1 | 2.316 | 2.433 | 2.73 |
| 2 | 2.32 | 2.338 | 2.321 |
| 3 | 2.321 | 2.323 | 2.325 |

TABLE XI
[Dissipation Factor (100 kc.) of 100° C. Oven-Aged Samples]

| | Time in Oven, hours | | |
|---|---|---|---|
| | No aging | 146 | 292 |
| Run No.: | | | |
| 1 | 0.0014 | 0.0053 | 0.0092 |
| 2 | 0.0013 | 0.0013 | 0.0013 |
| 3 | 0.0014 | 0.0013 | 0.0014 |

Thus the stabilized compound is seen to have better resistance to thermal and oxidative degradation than does the unstabilized polymer.

While there are above disclosed but a limited number of embodiments of the invention herein presented, it is possible to produce still other embodiments without departing from the inventive concept herein disclosed. It is desired, therefore, that only such limitations be imposed on the appended claim as are stated therein.

What is claimed is:

1. Polyethylene, stabilized against molecular degradation under conditions of elevated temperature and mechanical working with at least one $\alpha,\alpha'$-bis(laurylthio) xylene in an amount of from 0.001 to 5.0 parts by weight per 100 parts of said polyethylene.

References Cited

UNITED STATES PATENTS 3,293,209  12/1966  Baldwin et al. __ 260—45.7 XR

HOSEA E. TAYLOR, Jr., Primary Examiner

M. J. WELSH, Assistant Examiner

U.S. Cl. X.R.

260—45.95